United States Patent [19]

Kelly

[11] Patent Number: 5,059,075

[45] Date of Patent: Oct. 22, 1991

[54] RETRACTING SCREW ASSEMBLY

[75] Inventor: Francis J. Kelly, Baldwinsville, N.Y.

[73] Assignee: Cooper Industries, Inc., Houston, Tex.

[21] Appl. No.: 331,139

[22] Filed: Apr. 28, 1989

[51] Int. Cl.⁵ .................. F16B 21/18; F16B 39/00
[52] U.S. Cl. .......................... 411/107; 411/353; 411/999
[58] Field of Search ............. 411/107, 105, 185, 186, 411/352, 353, 965, 970, 999, 103

[56] References Cited

U.S. PATENT DOCUMENTS

| | | | |
|---|---|---|---|
| 1,927,780 | 9/1933 | Anderson | 411/107 |
| 3,018,127 | 1/1962 | Dogrosielski et al. | 411/999 |
| 3,056,443 | 10/1962 | Knocke | 411/186 |
| 3,263,728 | 8/1966 | Lynch | 411/999 |
| 3,295,578 | 1/1967 | Maloof | 411/999 |
| 3,437,119 | 4/1969 | Dey | 411/107 |
| 3,465,803 | 9/1969 | Ernest et al. | 411/999 |

Primary Examiner—Neill R. Wilson
Attorney, Agent, or Firm—David A. Rose; Nelson A. Blish

[57] ABSTRACT

A retracting screw assembly 10 for maintaining a screw 12 in the retracted position so that flame proof surface 28 is not scratched during opening and closing cover 18. Retracting screw assembly is comprised of a screw 12 with a threaded portion 34, washer 14, conical spring 16. When threaded portion 34 is disengaged from body portion 26, conical spring 16 pulls screw 12 into a retracted position so that threaded portion 34 rests against shoulder 20.

7 Claims, 1 Drawing Sheet

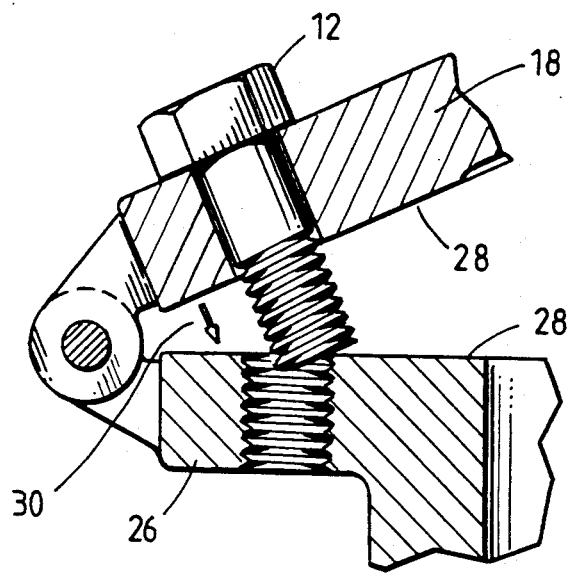
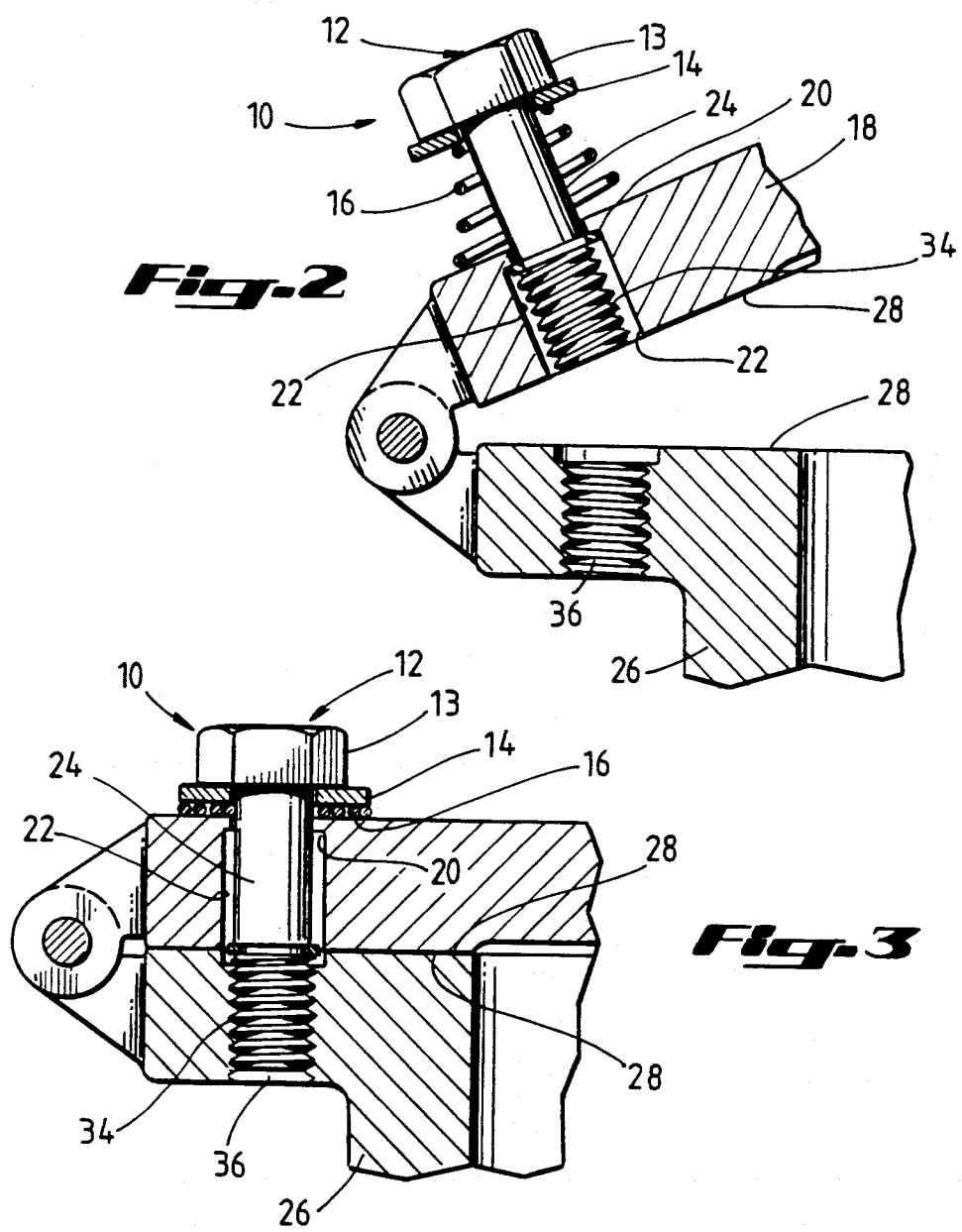

019 5,059,075

RETRACTING SCREW ASSEMBLY

This invention relates to explosion proof enclosures in general and in particular to retracting screw mechanisms for explosion proof enclosures.

BACKGROUND OF THE INVENTION

In flat joint explosion proof enclosures it is necessary that the mating surfaces be machined to close tolerances so that the surfaces are in intimate contact. Often these enclosures are of cast metal and quite heavy and the cover is hinged and swings outward. The screws which hold the cover to the enclosure body when the cover is closed can scratch the mating surfaces and lead to failure of the flame tight boundary if protruding below the surface of the cover when the cover is swung closed.

Prior art attempts to solve this problem have involve the use of friction type sleeves, so that after the screw was disengaged it could be pulled out to a stop and held in place in a retracted position. The disadvantage of this arrangement was that the operator may forget to retract all the screws and therefore the flame surface would be damaged.

SUMMARY OF THE INVENTION

The present invention uses a conical nested compression spring to retract cover screws into an extracted position so that the end of the screw is above the flame-proof surface. This arrangement insures that the screw will not damage the flame-proof surface and the retraction is automatic and does not depend on operator action.

BRIEF DESCRIPTION OF THE DRAWINGS

FIG. 1 is a sectional view from the top of a prior art explosion-proof enclosure with the screw contacting the flame-proof surface.

FIG. 2 is a cut-a-way view from the top of a retracting screw according to the present invention in the disengaged position.

FIG. 3 is a cut-a-way view of an explosion-proof enclosure with the cover in the closed position.

DETAILED DESCRIPTION OF THE INVENTION

FIG. 1 shows a prior art explosion-proof enclosure with the hinged door in the open position. It is seen that screw 12 which has not been retracted by the operator is protruding below the surface 28 of cover 18. In this position as cover 18 is closed in a direction shown by arrow 30, the end of screw 12 will scratch the flame-proof surface 28 on body 26. Scratches on the flame-proof surface 28 may result in propagation of an explosion internal to the enclosure to the outside environment. The screw may also be damaged or broken. Since these screws often are high tensile strength, and not easily replaced locally, the enclosure may be rendered inoperative.

The present invention shown in FIG. 2 shows a retracting screw assembly designated in general by reference numeral 10 with screw 12 in the retracted position. Screw 12 is comprised of shank 24 and threaded portion 34. In the retracted position a retaining means, such as a retaining member or threaded portion 34 rests against shoulder 20 which is cast into cover 18. When threaded portion 34 of screw 12 disengages from tapped hole 36, conical spring 16 pushes against washer 14 and retracts screw 12 until threaded portion 34 butts up against shoulder 20. In this position the end of screw 12 is above the flame-proof surface 28 of cover flange 18. Thus it is seen that when cover flange 18 is opened or closed there is no danger of screw 12 damaging flame-proof surface 28 on body 26.

Using a conical spring 16 rather than a standard helical spring, has several advantages. As the spring 16 is compressed when screw 12 is engaged fully, the shape of the spring limits the height of the spring to the diameter of the wire. Also, in the fully compressed position the conical shape provides for an even distribution of the compression force or clamping force of the screw on the outer surface of flange cover 18.

As retracting screw assembly 10 is assembled washer 14, is placed over the screw 12 so that it butts up against head 13 of screw 12. Next the conical spring 16 is inserted. In the preferred embodiment, conical spring is inserted so that the narrow end of the coil is against washer 14 although the broad end may also be placed against washer 14. Retracting screw assembly 10 is then threaded through shoulder 20 for insertion into cover flange 18. When cover flange 18 is closed against body flange 26, screw 12 may be pushed in so that threaded portion 34 may be screwed into tapped hole 36.

I claim:

1. A retracting screw assembly for use in explosion-proof enclosures comprising:
   a screw having a head, a shank, and a threaded portion on that end opposite said head;
   a washer having an aperture for receiving said shank and threaded portion and engaging said head;
   a conical spring having coils receiving said shank and being coiled from a minor diameter coil to a major diameter coil, said coils becoming nested within said major diameter coil upon full compression;
   a cover on said enclosure having an aperture with a restricted opening adjacent the outer face of said cover, said spring being mounted between said cover and said washer;
   a body portion on said enclosure having a threaded aperture adapted for alignment with said cover aperture;
   a shoulder formed by said restricted opening on said cover;
   retaining means on said threaded portion for engaging said shoulder;
   said threaded portion threadingly engaging said threaded aperture and causing said head and washer to compress said spring and cause said coils to nest within said major diameter coil, said washer engaging one side of said nested coils and said cover face engaging an opposite side of said nested coils;
   whereby upon said threaded portion being disengaged from said threaded aperture of said body, said retaining means is pulled against said shoulder by said spring.

2. A screw assembly as in claim 1 wherein said washer is integral with said screw.

3. A retracting screw assembly as in claim 1 wherein said washer is a separate part of said screw.

4. The retracing screw assembly as in claim 1 wherein said retaining means includes a retaining member disposed on said screw above said threaded portion.

5. The retracting screw assembly as in claim 1 wherein said major diameter coil has an outer diameter greater than the diameter of said washer whereby said conical spring when nested evenly transfers the force between said washer and said cover face.

6. The retracting screw assembly as in claim 1 wherein the diameter of said restricted opening is smaller than the diameter of said minor diameter coil.

7. The retracting screw assembly as in claim 1 wherein said body portion includes a counterbore adjacent said threaded aperture.

* * * * *